United States Patent
Bae et al.

(10) Patent No.: US 10,033,482 B2
(45) Date of Patent: Jul. 24, 2018

(54) SYSTEM AND METHOD FOR PROVIDING INTERFERENCE PARAMETER ESTIMATION FOR MULTI-INPUT MULTI-OUTPUT (MIMO) COMMUNICATION SYSTEM

(71) Applicant: Samsung Electronics Co., Ltd., Gyeonggi-do (KR)

(72) Inventors: Jung Hyun Bae, San Diego, CA (US); Dongwoon Bai, San Diego, CA (US); Jungwon Lee, San Diego, CA (US)

(73) Assignee: Samsung Electronics Co., Ltd (KR)

( * ) Notice: Subject to any disclaimer, the term of this patent is extended or adjusted under 35 U.S.C. 154(b) by 1 day.

(21) Appl. No.: 15/280,215

(22) Filed: Sep. 29, 2016

(65) Prior Publication Data
US 2018/0041306 A1     Feb. 8, 2018

Related U.S. Application Data

(60) Provisional application No. 62/370,464, filed on Aug. 3, 2016, provisional application No. 62/384,504, filed on Sep. 7, 2016.

(51) Int. Cl.
*H04B 1/10*    (2006.01)
*H04L 1/00*    (2006.01)
(Continued)

(52) U.S. Cl.
CPC ......... *H04L 1/0054* (2013.01); *H04B 7/0413* (2013.01); *H04B 7/0456* (2013.01);
(Continued)

(58) Field of Classification Search
CPC ........... H04L 25/03038; H04L 27/2647; H04L 2025/03414; H04L 25/03057; H04B 1/1036
(Continued)

(56) References Cited

U.S. PATENT DOCUMENTS 7,190,734 B2 * 3/2007 Giannakis ............. H04L 1/0618
375/260
7,869,536 B2 * 1/2011 Li ....................... H04B 7/0413
375/267
(Continued)

FOREIGN PATENT DOCUMENTS

EP          2 309 689        4/2011

OTHER PUBLICATIONS

Li, Peng et al., Adaptive Decision Feedback Detection with Constellation Constraints for MIMO Systems, Copyright 2011 IEEE, pp. 7.

*Primary Examiner* — James M Perez
(74) *Attorney, Agent, or Firm* — The Farrell Law Firm, P.C.

(57) ABSTRACT

A method and apparatus are provided. The method includes receiving a desired signal from a serving base station, receiving a plurality of interfering signals from one or more base stations, estimating a maximum likelihood (ML) decision metric of interfering signals, applying a logarithm function to the ML decision metric, and applying a maximum-log approximation function to a serving data vector and an interference data vector, which are included in the ML decision metric, determining the values of a transmit power, a rank, a precoding matrix, a modulation order and a transmission scheme using the applied ML decision metric, and cancelling the interfering signals from the received signals using the determined values of transmit power, rank, precoding matrix, modulation order and transmission scheme.

20 Claims, 5 Drawing Sheets

(51) Int. Cl.
*H04B 7/0413* (2017.01)
*H04B 7/0456* (2017.01)
*H04J 11/00* (2006.01)
*H04B 17/318* (2015.01)

(52) U.S. Cl.
CPC .......... *H04B 17/318* (2015.01); *H04J 11/003* (2013.01); *H04L 1/0003* (2013.01)

(58) Field of Classification Search
USPC .................................................. 375/316–352
See application file for complete search history.

(56) References Cited

U.S. PATENT DOCUMENTS

| | | | |
|---|---|---|---|
| 7,957,484 B2 | 6/2011 | Waters et al. | |
| 8,135,098 B2* | 3/2012 | Lee | H04B 1/1027 375/233 |
| 8,223,896 B2 | 7/2012 | Zangi et al. | |
| 8,300,737 B2 | 10/2012 | Duggan | |
| 8,315,556 B2* | 11/2012 | Yu | H04B 7/0854 370/274 |
| 8,345,793 B2 | 1/2013 | Dent | |
| 8,374,274 B2 | 2/2013 | Park et al. | |
| 8,411,806 B1* | 4/2013 | Lee | H04L 25/03305 375/340 |
| 8,457,220 B2* | 6/2013 | Suh | H04B 7/0619 375/260 |
| 8,588,316 B2 | 11/2013 | Fujii | |
| 8,687,751 B1* | 4/2014 | Lee | H04J 11/004 370/205 |
| 8,711,959 B2* | 4/2014 | Lee | H04L 27/2657 375/262 |
| 8,711,989 B1* | 4/2014 | Lee | H04L 25/03305 375/340 |
| 8,908,743 B2 | 12/2014 | Badic et al. | |
| 8,917,786 B1 | 12/2014 | von der Embse | |
| 8,953,667 B2 | 2/2015 | Bai et al. | |
| 9,025,691 B1* | 5/2015 | Wu | H04B 1/06 375/267 |
| 9,071,295 B1* | 6/2015 | Lee | H04L 25/03305 |
| 9,197,364 B1 | 11/2015 | von der Embse | |
| 9,197,461 B1* | 11/2015 | Sun | H04B 7/04 |
| 9,288,097 B2* | 3/2016 | Lee | H04B 1/10 |
| 9,312,968 B2 | 4/2016 | Choi et al. | |
| 9,473,332 B2* | 10/2016 | Bajcsy | H04B 1/40 |
| 9,619,428 B2* | 4/2017 | Mantor | G06F 9/30087 |
| 9,627,263 B1* | 4/2017 | He | H01L 21/823431 |
| 9,698,938 B2* | 7/2017 | Lee | H04L 1/0038 |
| 2002/0072866 A1* | 6/2002 | Beffa | G01R 31/2894 702/34 |
| 2005/0053172 A1* | 3/2005 | Heikkila | H04B 1/71057 375/333 |
| 2005/0201478 A1* | 9/2005 | Claussen | H04B 1/71075 375/261 |
| 2006/0198460 A1* | 9/2006 | Airy | H04B 7/04 375/267 |
| 2007/0183541 A1* | 8/2007 | Moorti | H04L 25/067 375/341 |
| 2007/0280387 A1* | 12/2007 | Li | H04B 7/0413 375/347 |
| 2008/0279298 A1* | 11/2008 | Ben-Yishai | H04L 25/03242 375/261 |
| 2009/0026600 A1* | 1/2009 | Koon | H01L 23/49555 257/686 |
| 2009/0213946 A1* | 8/2009 | Dick | G06F 17/5054 375/260 |
| 2010/0027688 A1* | 2/2010 | Suh | H04B 7/0619 375/260 |
| 2010/0027697 A1* | 2/2010 | Malladi | H04B 7/0417 375/260 |
| 2010/0248729 A1* | 9/2010 | Yu | H04B 7/026 455/450 |
| 2012/0045024 A1 | 2/2012 | Cui et al. | |
| 2014/0243030 A1 | 8/2014 | Kim et al. | |
| 2014/0369397 A1* | 12/2014 | Nakamura | H04B 7/0456 375/232 |
| 2015/0098440 A1 | 4/2015 | Yang et al. | |
| 2015/0110216 A1* | 4/2015 | Bajcsy | H04B 1/40 375/285 |
| 2015/0127447 A1* | 5/2015 | Joshi | G06Q 30/0225 705/14.26 |
| 2015/0229373 A1* | 8/2015 | Lee | H04B 1/10 375/347 |
| 2015/0340330 A1* | 11/2015 | Pan | H01L 21/268 257/622 |
| 2016/0036547 A1* | 2/2016 | Lee | H04B 7/0486 370/329 |
| 2016/0065258 A1* | 3/2016 | Lee | H04B 7/0456 375/346 |
| 2016/0366003 A1* | 12/2016 | Kwon | H04L 1/0001 |
| 2016/0373204 A1* | 12/2016 | Yamada | H04J 11/00 |
| 2017/0245286 A1* | 8/2017 | Rahmati | H04W 72/082 |
| 2017/0251517 A1* | 8/2017 | Kimura | H04W 76/046 |
| 2017/0310417 A1* | 10/2017 | Jung | H04J 15/00 |
| 2017/0316116 A1* | 11/2017 | Elliott | G06F 17/504 |
| 2017/0316604 A1* | 11/2017 | Yang | G06T 17/10 |
| 2017/0331654 A1* | 11/2017 | Song | H04L 27/2334 |
| 2018/0041306 A1* | 2/2018 | Bae | H04B 7/0456 |

* cited by examiner

SYSTEM AND METHOD FOR PROVIDING INTERFERENCE PARAMETER ESTIMATION FOR MULTI-INPUT MULTI-OUTPUT (MIMO) COMMUNICATION SYSTEM

PRIORITY

This application claims priority under 35 U.S.C. § 119(e) to U.S. Provisional Patent Application No. 62/370,464, which was filed in the U.S. Patent and Trademark Office on Aug. 3, 2016, and to U.S. Provisional Patent Application No. 62/384,504, which was filed in the U.S. Patent and Trademark Office on Sep. 7, 2016, the entire content of each of which is incorporated herein by reference.

FIELD

The present disclosure generally relates to a method and apparatus, and more particularly, to a method and apparatus for interference parameter estimation in multi-input multi-output (MIMO) communication systems.

BACKGROUND

Users of electronic devices require increasing functionality in the applications and services provided by electronic devices and the communication networks used by electronic devices. Wireless communication networks using MIMO provide increased capacity for data and voice communications for the users of electronic devices. One of the challenges faced by wireless communication networks using MIMO is mitigation of undesired signals causing interference to desired signals received in a mobile terminal, particularly at a cell-edge where interfering signals from other cells may be stronger. Methods for mitigation of signal interference are necessary to improve cell-edge performance.

One of the requirements for mitigating the effects of interfering signals is knowledge of interference parameters of the interfering signals. However, interference parameters may not be provided to the electronic device via signaling or other methods, requiring the electronic device to estimate, or blind detect, the interference parameters. Interference parameter estimation is a required procedure for third generation partnership project (3GPP) long term evolution (LTE) Release-12 network assisted interference cancellation and suppression (NAICS). Interference parameters may be estimated by using a maximum likelihood (ML) method. However, the complexity of the ML method is relatively large especially for a MIMO communication network.

SUMMARY

An aspect of the present disclosure provides an interference cancellation method on the basis of NAICS interference parameters that are determined by blind-detection methods.

Another aspect of the present disclosure provides a blind detection method with low computational complexity in order to estimate interference parameters from adjacent interfering cells including transmit power level, rank, precoding matrix, modulation order (MOD) and transmission scheme.

Another aspect of the present disclosure provides a method for compensating for degradation of communication performance resulting from blind detection of interference parameters using low complexity methods.

Another aspect of the present disclosure provides a method which includes, but is not limited to, receiving a desired signal from a serving base station, receiving a plurality of interfering signals from one or more base stations, estimating a maximum likelihood (ML) decision metric of the plurality of interfering signals, applying a logarithm function to the ML decision metric, and applying a maximum-log approximation function to a serving data vector and an interference data vector, which are included in the ML decision metric, determining the values of a transmit power, a rank, a precoding matrix, a modulation, and a transmission scheme using the applied ML decision metric, and cancelling the interfering signals from the received signal using the determined values of transmit power, rank, precoding matrix, modulation order and transmission scheme.

Another aspect of the present disclosure provides an apparatus which includes, but is not limited a processor configured to receive a desired signal from a serving base station, receive a plurality of interfering signals from one or more base stations, estimate a maximum likelihood (ML) decision metric of the plurality of interfering signals, apply a logarithm function to the ML decision metric, and apply a maximum-log approximation function to a serving data vector and an interference data vector, which are included in the ML decision metric, determine the values of a transmit power, a rank, a precoding matrix, a modulation order and a transmission scheme using the applied ML decision metric, and cancel the interfering signals from the received signal using the determined values of transmit power, rank, precoding matrix, modulation order and transmission scheme.

Another aspect of the present disclosure provides a method of manufacturing a processor which includes, but is not limited to, forming the processor as part of a wafer or package that includes at least one other process, wherein the processor is configured to receive a desired signal from a serving base station, receive a plurality of interfering signals from one or more base stations, estimate a maximum likelihood (ML) decision metric of the plurality of interfering signals, apply a logarithm function to the ML decision metric, and apply a maximum-log approximation function to a serving data vector and an interference data vector, which are included in the ML decision metric, determine the values of a transmit power, a rank, a precoding matrix, a modulation order and a transmission scheme using the applied ML decision metric, and cancel the interfering signals from the received signals using the determined values of transmit power, rank, precoding matrix, modulation order and transmission scheme.

Another aspect of the present disclosure provides a method of constructing an integrated circuit which includes, but is not limited to generating a mask layout for a set of features for a layer of the integrated circuit, wherein the mask layout includes standard cell library macros for one or more circuit features that include a processor configured to receive a desired signal from a serving base station, receive a plurality of interfering signals from one or more base stations, estimate a maximum likelihood (ML) decision metric of the plurality of interfering signals, apply a logarithm function to the ML decision metric, and apply a maximum-log approximation function to a serving data vector and an interference data vector, which are included in the ML decision metric, determine the values of a transmit power, a rank, a precoding matrix, a modulation order and a transmission scheme using the applied ML decision metric, and cancel the interfering signals from the received signals using the determined values of transmit power, rank, precoding matrix, modulation order and transmission scheme.

BRIEF DESCRIPTION OF THE DRAWINGS

The above and other aspects, features and advantages of the present disclosure will become more apparent from the following detailed description, when taken in conjunction with the accompanying drawings, in which.

DETAILED DESCRIPTION

Figure 1:
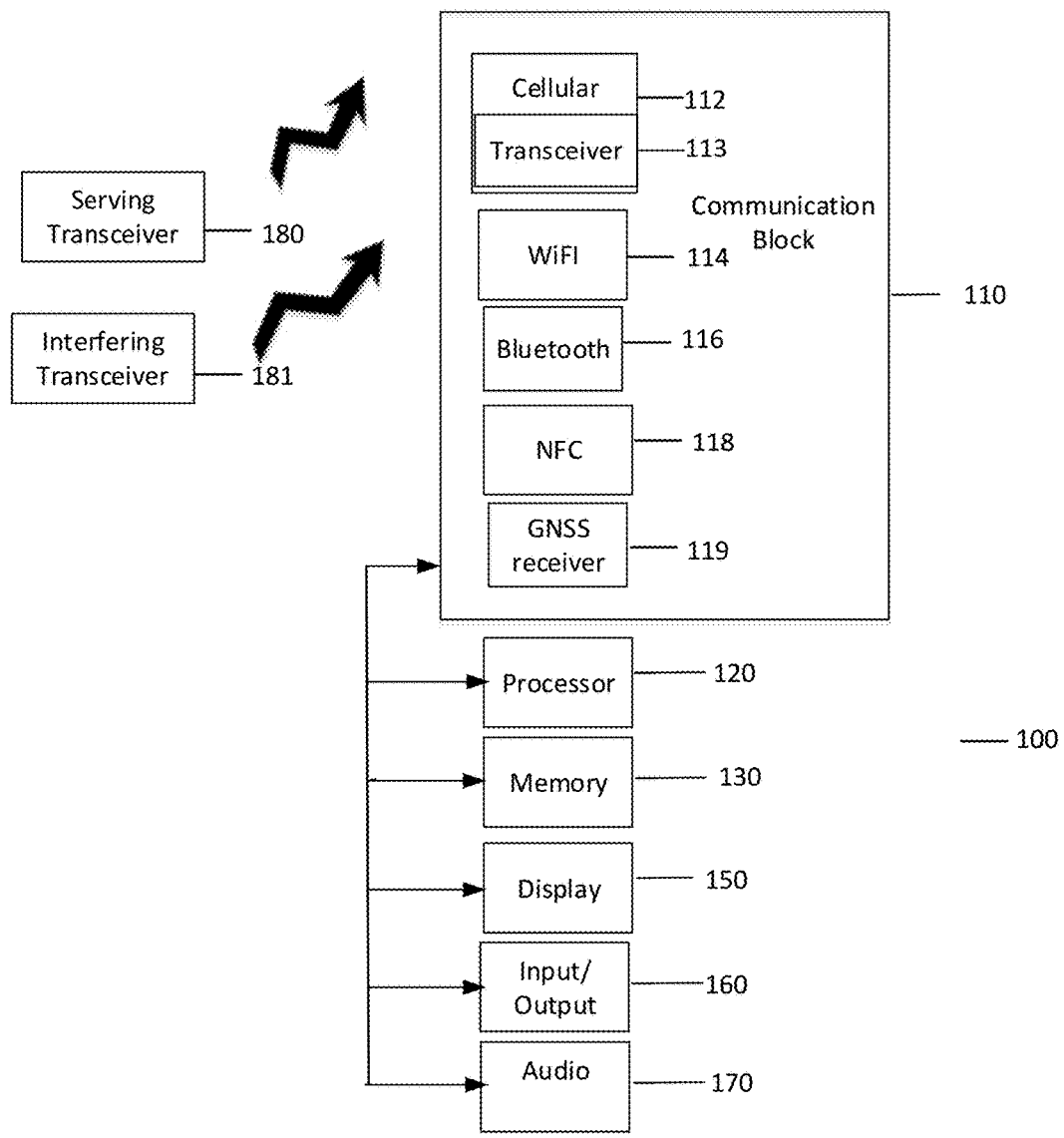
FIG. 1 is a block diagram of an electronic device in a communication network, according to an embodiment of the present disclosure.

The present disclosure will now be described more fully hereinafter with reference to the accompanying drawings, in which embodiments of the present disclosure are shown. This disclosure may, however, be embodied in many different forms and should not be construed as limited to the embodiments set forth herein. Rather, these embodiments are provided so that this disclosure will be thorough and complete, and will fully convey the scope of the device and method to those skilled in the art. In the drawings, the size and relative sizes of layers and regions may be exaggerated for clarity. Like reference numbers refer to like elements throughout.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. As used herein, the term "and/or" includes, but is not limited to, any and all combinations of one or more of the associated listed items.

It will be understood that, although the terms first, second, and other terms may be used herein to describe various elements, these elements should not be limited by these terms. These terms are only used to distinguish one element from another. For example, a first signal may be referred to as a second signal, and, similarly, a second signal may be referred to as a first signal without departing from the teachings of the disclosure.

The terminology used herein is for the purpose of describing particular embodiments only and is not intended to be limiting of the present device and method. As used herein, the singular forms "a", "an" and "the" are intended to include the plural forms as well, unless the context clearly indicates otherwise. It will be further understood that the terms "comprises" and/or "comprising," or "includes, but is not limited to" and/or "including, but not limited to" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including, but not limited to technical and scientific terms) used herein have the same meanings as commonly understood by one of ordinary skill in the art to which the present device and method belongs. It will be further understood that terms, such as those defined in commonly used dictionaries, should be interpreted as having meanings that are consistent with their meaning in the context of the relevant art and/or the present description, and will not be interpreted in an idealized or overly formal sense unless expressly so defined herein.

FIG. 1 is a block diagram of an electronic device in a network environment, according to an embodiment of the present disclosure.

Referring to FIG. 1, an electronic device 100 includes, but is not limited to, a communication block 110, a processor 120, a memory 130, a display 150, an input/output block 160, an audio block 170, a satellite transceiver, a serving transceiver 180, and an interfering transceiver 181. The serving transceiver 180 and the interfering transceiver 181 may be included in a cellular base station.

The electronic device 100 includes a communication block 110 for connecting the device 100 to another electronic device or a network for communication of voice and data. The communication block 110 provides cellular, wide area, local area, personal area, near field, device to device (D2D), machine to machine (M2M), satellite and short range communications. The functions of the communication block 110, or a portion thereof including a transceiver 113, may be implemented by a chipset. In particular, the cellular communications block 112 provides a wide area network connection through terrestrial base transceiver stations or directly to other electronic devices, using technologies such as D2D, M2M, long term evolution (LTE), fifth generation (5G), long term evolution advanced (LTE-A), code division multiple access (CDMA), wideband code division multiple access (WCDMA), universal mobile telecommunications system (UMTS), wireless broadband (WiBro), and global system for mobile communication (GSM). The cellular communications block 112 includes, but is not limited to, a chipset and the transceiver 113. The wireless fidelity (WiFi) communications block 114 provides a local area network connection through network access points using technologies such as IEEE 802.11. The Bluetooth communications block 116 provides personal area direct and networked communications using technologies such as IEEE 802.15. The near field communications (NFC) block 118 provides point to point short range communications using standards such as ISO/IEC 14443. The communication block 110 also includes a GNSS receiver 119. The GNSS receiver 119 may support receiving signals from the satellite transmitter.

The interfering transmitter may be associated with at least one of, for example, a global positioning system (GPS), a global navigation satellite system (Glonass), a Beidou navigation satellite system (Beidou), and a European global satellite-based navigation system (Galileo). The electronic device 100 may receive electrical power for operating the functional blocks from a power supply, including, but not limited to, a battery. The serving transceiver 180 may be a part of a terrestrial base transceiver station (BTS) (such as a cellular base station) and include a radio frequency transmitter and receiver conforming to cellular standards. The serving transceiver 180 may provide data and voice communications services to users of mobile user equipment (UE). The interfering transceiver 180 may provide data and voice communications services to users of mobile user equipment (UE), such as electronic device 100, which are being provided communication services in a cell other than the serving cell, such as a neighboring cell. The embodiments of the present disclosure may be extended to a case with multiple interfering transceivers such as an environment in which a UE is in range of multiple base stations such as a cellular communication system.

The processor 120 provides application layer processing functions required by the user of the electronic device 100. The processor 120 also provides command and control functionality for the various blocks in the electronic device 100. The processor 120 provides for updating control functions required by the functional blocks. The processor 120 may provide for coordination of resources required by the transceiver 113 including, but not limited to, communication control between the functional blocks. The processor 120 may also update the firmware, databases, lookup tables, calibration method programs and libraries associated with the cellular communications block 112. The cellular communications block 112 may also have a local processor or a chipset which dedicates computing resources to cellular communications block 112 and other functional blocks required for cellular communication. The processor 120 may execute code which determines values of interference parameters associated with interfering signals and cancels the interfering signals from received signals using the determined values interference parameters including transmit power, rank, precoding matrix, modulation order and transmission scheme. The rank value may include an integer value between 0 and 3. The precoding matrix may include an integer value between 0 and 7. The transmission scheme value may include an integer value between 1 and 7.

The memory 130 provides storage for device control program code, user data storage, application code and data storage. The memory 130 may provide data storage for the firmware, libraries, databases, lookup tables, algorithms, methods, interference parameters, and calibration data required by the cellular communications block 112. The program code and databases required by the cellular communications block 112 may be loaded into local storage within the cellular communications block 112 from the memory 130 upon device boot up. The cellular communications block 112 may also have local, volatile and non-volatile memory for storing the program code, libraries, databases, calibration data and lookup table data.

The display 150 may be a touch panel, and may be embodied as a liquid crystal display (LCD), organic light emitting diode (OLED) display, active matrix OLED (AMOLED) display, and the like. The input/output block 160 controls the interface to the user of the electronic device 100. The audio block 170 provides for audio input and output to/from the electronic device 100.

The serving transceiver 180 may include a base station that is used to receive, transmit or relay wireless signals. The serving transceiver 180 may facilitate communication with the electronic device 100 by sending, receiving, and relaying communication signals to and from the electronic device 100. The electronic device 100 may be connected to a network through the serving transceiver 180.

For example, the serving transceiver 180 may be a cell tower, a wireless router, an antenna, multiple antennas, or a combination thereof being used to send signals to, or receive signals from, the electronic device 100, such as a smartphone. The serving transceiver 180 may relay the wireless signals through the network to enable communication with other electronic devices 100 such as user equipment (UE), servers or a combination thereof. The serving transceiver 180 may be used to transmit the communication signals, such as voice or data. The electronic device 100 may receive and process signals from the serving transceiver 180.

Based on the communication method, such as code division multiple access (CDMA), orthogonal frequency division multiple access (OFDMA), third generation partnership project (3GPP) long term evolution (LTE), long term evolution advanced (LTE-A), fourth generation cellular wireless standards (4G), or fifth generation cellular wireless standards (5G), the communication signals may also have reference signals within the communicated information. The reference signals may be a predetermined training sequence. The predetermined training sequence may be embedded within the communicated information at a regular time interval.

The serving transceiver 180 may communicate with the electronic device 100 through a channel. The channel may encompass frequency, time slot, coding and may include the behavior of the wireless medium, such as reflection, interference and path loss. The serving transceiver 180 transmits signals and the electronic device 100 receives the transmitted signals. However, it is understood that both the electronic device 100 and the serving transceiver 180 may each transmit and receive signals.

The communication network may employ a multiple-input and multiple-output (MIMO) scheme for communicating with the electronic device through multiple antennas. A layer may be defined as a set of information communicated through a particular antenna or a particular set of antennas. Each layer may transmit a group of information to a specific electronic device. The communication network supporting the MIMO scheme may have a transmitted signal that includes various layers including a main layer and an interference layer, which may include all sets of information, communicated through the same set of antennas, that are intended for electronic devices other than the specific electronic device.

The main layer is defined as the layer for transmitting information to the electronic device 100. The interference layer is defined as all of the layers for transmitting information to other electronic devices which may be from multiple transceivers, multiple antennas and multiple cells. From the perspective of the electronic device 100, the information transmitted to other users through the interference layer may interfere with the information transmitted to the electronic device 100 through the main layer.

The main layer may be transmitted according to a main modulation. The main modulation is defined as the system of signal variations generated at the serving transceiver 180 in the carrier signal for transmitting the information to the electronic device 100. The main modulation may include analog or digital modulation methods, such as amplitude modulation or various keying techniques. For example, the main modulation may include phase-shift keying (PSK) such as quadrature PSK (QPSK), frequency-shift keying (FSK), amplitude-shift keying (ASK), 4 quadrature amplitude modulation (QAM), 16 QAM, 64 QAM, 256 QAM, 512 QAM and 1024 QAM.

The serving signal transmitted by the serving transceiver 180 may further include a serving reference signal which is known or designated information transmitted by the serving transceiver 180 to determine various types of information at a receiving electronic device 100. The serving reference signal may include a bit, a symbol, a signal pattern, a signal strength, index, code, frequency, phase, duration, or a combination thereof predetermined by the communication network standard (such as 3GPP). The details of the serving reference signal may be known and used by some or all electronic devices in the communication network. The detail, the structure, the content, or a combination thereof for the serving reference signal may be used by the receiving device, such as the electronic device 100, to determine information regarding mechanisms used to transmit or receive data.

The communication network may further include an interference signal from an interference source generating signals unintended for a specific receiver. For example, the interfering transceiver 181 source may include various transmitters, including a base station, a relay, a repeater, another electronic device, such as a smart phone or a laptop computer, a broadcasting station, or a combination thereof.

According to an embodiment of the present disclosure, an apparatus and method are provided for efficient interference parameter estimation. The methods includes efficient algorithms which approximate maximum-likelihood (ML) interference parameter estimation while reducing computational complexity.

ML parameter estimation may require a summation of exponential functions over constellations of the serving signal as well as constellations of interfering signals. In an embodiment of the present disclosure, a method is provided which approximates maximum-likelihood (ML) interference parameter estimation by removing a summation over constellations of a serving signal and providing a multi-dimensional summation over constellations of interfering signals with multiple single-dimensional summations. Accordingly, the present disclosure provides a method with decreased computation complexity.

In order to avoid multiplying exponential sums through all search spaces, the present disclosure provides a method by which the ML decision metric is applied with a logarithm, and then the maximum-log approximation is applied to the serving data vector.

In another embodiment of the present disclosure, a method is provided which further approximates interference parameter estimation by utilizing approximation techniques disclosed in U.S. Pat. No. 8,953,667, the entire content of which is incorporated herein by reference, for each single-dimensional summation including Gaussian approximation of other layer signals and characterization of a bias term as a function of per-layer modified interference to signal plus noise ratio (ISNR). The modified ISNR is characterized in that only a residual component of the undesired interference signal contributes to the ISNR value.

According to an embodiment of the present disclosure, a signal received by cellular communications block 112 of electronic device 100 may be modeled by $y_k$ at sample k and is defined by Equation (1) below:

$$y_k = \sqrt{\rho_k^S} H_k^S P_k^S x_k^S + \sqrt{\rho_k^I} H_k^I P_k^I x_k^I + n_k. \qquad (1)$$

where $y_k$ is an (Nrx×1) vector and Nrx is the number of receive antennas supporting MIMO in the electronic device 100. The superscript "s" denotes parameters associated with a serving transceiver 180 in a serving cell of the electronic device 100 and the superscript "I" denotes parameters associated with the interfering transceiver 181 in adjacent interference producing cells.

According to an embodiment of the present disclosure, a serving transmit power level $\rho_k^s$, a (Ntx,S×$N_k^S$) serving precoding matrix $P_k^s$, a number of serving layers $N_k^S$, and modulation order(s) of ($N_k^S$×1) serving a transmitted signal $x_k^s$, are known at the cellular communications block 112. $n_k$ is defined as (Nrx×1) circularly symmetric Gaussian noise. In addition, a (Nrx×Ntx,S) serving channel matrix $H_k^s$, and a (Nrx×Ntx,I) interference channel matrix 111, are also known. The cellular communications block 112 of the electronic device 100 is unaware of an interference transmit power $\rho_k^I$, a (Ntx,I×$N_k^I$) interference precoding matrix $P_k^I$, a number of interference layers $N_k^I$, modulation order(s) $q_k^I$ of ($N_k^I$×1) interfering transmitted signal 4.

According to an embodiment of the present disclosure, the interference parameters $\rho_k^I$, $P_k^I$, $N_k^I$, $q_k^I$ are estimated using algorithms executed by the processor 120 using code stored in the memory 130. The interference parameters $\rho_k^I$, $P_k^I$, $N_k^I$, $q_k^I$ have values from finite sets. Further, there are K number of samples of an interfering signal with which the parameters $\rho_k^I$, $P_k^I$, NI, $q_k^I$ do not vary. The present disclosure is based on K number samples, therefore the dependency on k is dropped. In addition, the parameters $\rho_k^S$, $P_k^S$, $N_k^S$, $q_k^S$ of a serving signal do not vary within K number of samples. The metric $\mathcal{M}_{\rho^I,P^I,N^I,q^I}$ is computed for every possible combination of $\rho_k^I$, $P_k^I$, $N_k^I$, $q_k^I$ and the selected values of $\hat{\rho}^I$, $\hat{P}^I$, $\hat{N}^I$, $\hat{q}^I$ are those which maximize $\mathcal{M}_{\rho^I,P^I,N^I,q^I}$. To enable the method of the present disclosure, $\rho_k^I$, $P_k^I$, $N_k^I$, $q_k^I$ need to belong to a finite set. For example, in Release-12 of the 3GPP standards for NAICS, $\rho_k^I$ belongs to a set of size 3, and $N_k^I$ belongs to a set of size 2. $q_k^I$ belongs to a set of size 3. Set size for $P_k^I$ depends on $N_k^I$. If $N_k^I$ is 1, then $P_k^I$ belongs to a set of size 4. If $N_k^I$ is 2, then $P_k^I$ belongs to a set of size 3.

In the case of a non-space frequency block coding (non-SFBC) serving cell, when the serving signal $x_k^S$ has independence with respect to 'k', $x_{k1}^S$ and $x_{k2}^S$ are independent if k1≠k2. One example in which a transmitted signal has dependency with respect to 'k' is space frequency block coding (SFBC). Therefore, in the case of a non-SFBC serving cell, the optimal ML parameter estimation metric is defined by Equation (2) below:

$$\mathcal{M}_{\rho^I,P^I,N^I,q^I}^{ML} = \sum_{k=1}^{K} \log\left( \sum_{x^S \in \prod_{i=1}^{N^S} \chi_{q_i^S}} \frac{1}{\prod_{i=1}^{N^I} |\chi_{q_i^I}|} \sum_{x^I \in \prod_{i=1}^{N^I} \chi_{q_i^I}} \exp\left( -\frac{\|y_k - \sqrt{\rho^S} H_k^S P^S x^S - \sqrt{\rho^I} H_k^I P^I x^I\|^2}{\sigma_n^2} \right) \right), \qquad (2)$$

where $\chi_q$ is a set of constellation points for modulation order 'q', and $\sigma_n^2$ is a variance of $n_k$.

An ML decision generated by using the ML metric defined in Equation (2) above is given as $\hat{\rho}^I$, $\hat{P}^I$, $\hat{N}^I$, $\hat{q}^I$=argmax$_{\rho^I,P^I,N^I,q^I}\mathcal{M}_{\rho^I,P^I,N^I,q^I}^{ML}$. The ML parameter estimation defined in Equation (2) above assumes that the parameters $\rho^I$, $P^I$, $N^I$, $q^I$ are estimated based on the above ML decision. However, within the methods provided in the present disclosure, any subset of such parameters may be estimated when other parameters are known. The ML method is computationally complex, as compared to other methods, due to the summation of exponential functions.

In order to reduce computational complexity, a dimension reduced log-map (DR-LM) approximation is defined by Equation (3) below:

$$M^{DL-LM}_{\rho^I,P^I,N^I,q^I} = \sum_{k=1}^{K} \log \left( \frac{1}{\prod_{i=1}^{N^I} |\chi_{q_i^I}|} \sum_{x^I \in \prod_{i=1}^{N^I} \chi_{q_i^I}} \exp\left(-\frac{\|y_k - \sqrt{\rho^S} H_k^S P^S \hat{x}_k^S - \sqrt{\rho^I} H_k^I P^I x^I\|^2}{\sigma_n^2}\right) \right), \quad (3)$$

where $(\hat{x}_k^S, \hat{x}_k^I) = \arg\min_{x^S, x^I} (\|y_k - \sqrt{\rho^S} H_k^S P^S x^S - \sqrt{\rho^I} H_k^I P^I x^I\|)$ creates the minimum Euclidian distance between a serving signal and a hypothetical interfering signal. DR-LM reduces computational complexity by removing the summation over a serving constellation. The DR-LM decision rule is similar to the ML decision rule by replacing the ML metric $M_{\rho^I,P^I,N^I,q^I}^{ML}$ with $M_{\rho^I,P^I,N^I,q^I}^{DR-LM}$ as $\hat{\rho}^I$, $\hat{P}^I$, $\hat{N}^I$, $\hat{q}^I = \arg\max_{\rho^I,P^I,N^I,q^I} M_{\rho^I,P^I,N^I,q^I}^{DR-LM}$. The above decision rule applies to the methods described in the present disclosure. However, the DR-LM approximation requires the summation of a large number of exponential functions when $N^I$ is large, thereby increasing its computational complexity.

According to an embodiment of the present disclosure, the DR-LM method described above may be further reduced in computational complexity by a further dimension reduced log-map method, hereinafter referred to as FDR-LM1.

The further dimension reduced log-map (FDR-LM1) approximation method is defined in Equation (4) below:

$$M^{FDR-LM1}_{\rho^I,P^I,N^I,q^I} = \sum_{k=1}^{K} \log \left( \frac{1}{\prod_{i=1}^{N^I} |\chi_{q_i^I}|} \left\{ \sum_{i=1}^{N^I} \sum_{x^I \in \chi_{q_i^I}} \exp\left(-\frac{\|y_k - \sqrt{\rho^S} H_k^S P^S \hat{x}_k^S - \sqrt{\rho^I} H_k^I P^I f_i(x^I, \hat{x}_k^I)\|^2}{\sigma_n^2}\right) - (N^I - 1) \exp\left(-\frac{\|y_k - \sqrt{\rho^S} H_k^S P^S \hat{x}_k^S - \sqrt{\rho^I} H_k^I P^I \hat{x}_k^I\|^2}{\sigma_n^2}\right) \right\} \right) \quad (4)$$

where $f_i(x, w)$ for a vector w, is defined in Equation (5) below:

$$\text{jth element of } f_i(x, w) = \begin{cases} \text{jth element of } w, & \text{for } j \neq i \\ x, & \text{for } j = i \end{cases} \quad (5)$$

FDR-LM is less computationally complex than DR-LM as DR-LM requires a product of $$\prod_{i=1}^{N^I} |\chi_{q_i^I}|$$

number of exponential functions while FDR-LM has only a summation of $$\sum_{i=1}^{N^I} |\chi_{q_i^I}|$$

number of exponential functions. The additional subtraction term $$(N^I - 1) \exp\left(-\frac{\|y_k - \sqrt{\rho^S} H_k^S P^S \hat{x}_k^S - \sqrt{\rho^I} H_k^I P^I \hat{x}_k^I\|^2}{\sigma_n^2}\right)$$

in Equation (4) above is required in order to not over-count minimum distance contribution. Depending on implementation of the method, the additional subtraction term may not be necessarily realized as a subtraction, i.e., such subtraction terms may be skipped during summation. In this case, the total number of summands becomes $$\sum_{i=1}^{N^I} |\chi_{q_i^I}| - (N^I - 1).$$

Depending on implementation of the method, the use of $\hat{x}_{k,i}^S(x^I)$ and $\hat{x}_{k,i}^I(x^I)$ instead of $\hat{x}_k^S$ and $\hat{x}_k^I$ may be desirable where $$(\hat{x}_{k,i}^S(x^I), \hat{x}_{k,i}^I(x^I)) = \arg\min_{x^S, x_{-i}^I} (\|y_k - \sqrt{\rho^S} H_k^S P^S x^S - \sqrt{\rho^I} H_k^I P^I x^I\|).$$

$a_{-i}$ of a vector a are all elements of the vector a except for the i-th element.

According to an embodiment of the present disclosure, the FDR-LM method described above may be further reduced in computational complexity by a method, hereinafter referred to as FDR-LM2, that does not require additional subtraction operations as defined in Equation (6) below:

$$M^{FDR-LM2}_{\rho^I,P^I,N^I,q^I} = \sum_{k=1}^{K} \log \left( \frac{1}{\prod_{i=1}^{N^I} |\chi_{q_i^I}|} \sum_{i=1}^{N^I} \sum_{x^I \in \chi_{q_i^I}} \exp\left(-\frac{\|y_k - \sqrt{\rho^S} H_k^S P^S \hat{x}_k^S - \sqrt{\rho^I} H_k^I P^I f_i(x^I, \hat{x}_k^I)\|^2}{\sigma_n^2}\right) \right) \quad (6)$$

Similar to FDR-LM1, $\hat{x}_{k,i}^S(x^I)$ and $\hat{x}_{k,i}^I(x^I)$ may be used instead of $\hat{x}_k^S$ and $\hat{x}_k^I$.

According to an embodiment of the present disclosure, the present system and method provides further approximation of FDR-LM that may remove summation of exponential functions. The present system and method provides approximation of FDR-LM2 by providing Gaussian approximation of an unwanted signal.

The expression $y_k - \sqrt{\rho^S} H_k^S P^S \hat{x}_k^S - \sqrt{\rho^I} H_k^I P^I f_i(x^I, \hat{x}_k^I)$ may be re-written as $y'_{k,i} - \sqrt{\rho^I} H_k^I P_{[:,I]}^I x$ where $y'_{k,i} = \sqrt{\rho^I} H_k^I P_{[:,I]}^I x_i^I + \tilde{n}_{k,i}$, and $\tilde{n}_{k,i} = \sqrt{\rho^S} H_k^S P^S (x_k^S - \hat{x}_k^S) + \sqrt{\rho^I} H_k^I P_{[:,-i]}^I (x_{k,-i}^I - \hat{x}_{k,-i}^I) + n_k$. In other words, the summation of $|\chi_{q_i^I}|$ exponential terms for the i-th interference layer in the FDR-LM2 method may be considered as a single-layer ML metric with an observation $y'_{k,i}$ and Gaussian noise $\tilde{n}_{k,i}$. Since an ML metric with single layer transmission is already approximated as described in "Communication System with Modulation Classifier and Method of Operation Thereof" (U.S. Pat. No. 8,953,667, the entire content of which is incorporated herein by reference), this approximation technique may be used to approximate FDR-LM. Gaussian approximation of $\tilde{n}_{k,i}$ is assumed although the distribution is actually not Gaussian.

According to an embodiment of the present disclosure, the FDR-LM2 method described above may be further reduced in computational complexity by approximation methods, hereinafter referred to as AFDR-LM2.

The approximated FDR-LM2 (AFDR-LM2) is defined in Equation (7) below:

$$M_{\rho^I,P^I,N^I,q^I}^{AFDR-LM2} = \sum_{k=1}^{K} \left\{ -\frac{\|y_k - \sqrt{\rho^S} H_k^S P^S \hat{x}_k^S - \sqrt{\rho^I} H_k^I P^I \hat{x}_k^I\|^2}{\sigma_n^2} + \log\left(\sum_{i=1}^{N^I} \exp\{\Delta(q_i^I, \alpha_i)\}\right) - \sum_{i=1}^{N^I} \log(|\chi_{q_i^I}|) \right\}, \quad (7)$$

where $\Delta(\cdot,\cdot)$ is a bias function as described in reference U.S. Pat. No. 8,953,667.

For each sample k, AFDR-LM2 is realized by determining a minimum Euclidian distance between a serving signal and a hypothetical interferer $\|y_k - \sqrt{\rho^S} H_k^S P^S \hat{x}_k^S - \sqrt{\rho^I} H_k^I P^I \hat{x}_k^I\|$ and combining with a bias term $\log(\sum_{i=1}^{N^I} \exp\{\Delta(q_i^I, \alpha_i)\})$. The bias term $\log(\sum_{i=1}^{N^I} \exp\{\Delta(q_i^I, \alpha_i)\})$ may use an efficient implementation of $\log(\sum_{i=1}^{N} \exp\{x_i\})$ which is based on $g_2(x_0, x_i) = \max(x_0, x_i) + \log(1 + e^{-|x_0 - x_1|}) = \log(e^{x_0} + e^{x_1})$. The bias term may be computed on a per-layer basis and may be referred to as a per-layer bias.

For a complete characterization of the AFDR-LM2 method, $\alpha_i$ is determined based on modified per-layer ISNR. $\text{cov}(\tilde{n}_{k,i})$ may be a covariance matrix of $\tilde{n}_{k,i}$. $\text{cov}(\tilde{n}_{k,i})$ may be determined based on a soft decision of $\hat{x}_k^S$ and $\hat{x}_{k,-i}^I$. Therefore, $\alpha_i$ may be determined as $\alpha_i = \rho^I (P_{[:,i]}^I)^H (H_k^I)^H \text{cov}^{-1}(\tilde{n}_{k,i}) H_k^I P_{[:,i]}^I$.

According to an embodiment of the present disclosure, $$\alpha_i = \beta \frac{\rho^I (P_{[:,i]}^I)^H (H_k^I)^H H_k^I P_{[:,i]}^I}{\sigma_n^2}$$

may be used, where $0 < \beta \leq 1$ is a discount factor, and $$\frac{\rho^I (P_{[:,i]}^I)^H (H_k^I)^H H_k^I P_{[:,i]}^I}{\sigma_n^2}$$

is an interference-to-noise ratio (INR).

The desired analytical value of $\alpha_i$ is $\alpha_i = \rho^I (P_{[:,i]}^I)^H (H_k^I)^H \text{cov}^{-1}(\tilde{n}_{k,i}) H_k^I P_{[:,i]}^I$ as shown above. Since this value may be computationally complex and difficult to compute, the term $$\frac{\rho^I (P_{[:,i]}^I)^H (H_k^I)^H H_k^I P_{[:,i]}^I}{\sigma_n^2}$$

may be used instead to compute an approximation of $\alpha_i$. The term $$\frac{\rho^I (P_{[:,i]}^I)^H (H_k^I)^H H_k^I P_{[:,i]}^I}{\sigma_n^2}$$

is always greater than or equal to $\rho^I (P_{[:,i]}^I)^H (H_k^I)^H \text{cov}^{-1}(\tilde{n}_{k,i}) H_k^I P_{[:,i]}^I$, so a discount factor $\beta$ needs to be applied to $$\frac{\rho^I (P_{[:,i]}^I)^H (H_k^I)^H H_k^I P_{[:,i]}^I}{\sigma_n^2}$$

According to another embodiment of the present disclosure, $$\alpha_i = \gamma \frac{\rho^I (P_{[:,i]}^I)^H (H_k^I)^H H_k^I P_{[:,i]}^I}{\sigma_n^2} + (1-\gamma) \rho^I (P_{[:,i]}^I)^H (H_k^I)^H \text{cov}^{-1}(\tilde{\tilde{n}}_{k,i}) H_k^I P_{[:,i]}^I$$

may be used, where $0 < \gamma \leq 1$, and $\tilde{\tilde{n}}_{k,i} = \sqrt{\rho^S} H_k^S P^S x_k^S + \sqrt{\rho^I} H_k^I P_{[:,-i]}^I x_{k,-i}^I + n_k$. It is noted that $\rho^I (P_{[:,i]}^I)^H (H_k^I)^H \text{cov}^{-1}(\tilde{n}_{k,i}) H_k^I P_{[:,i]}^I$ is the ISNR of a linear wireless receiver.

According to an embodiment of the present disclosure, the FDR-LM1 method described above may be further reduced in computational complexity by approximation methods, hereinafter referred to as AFDR-LM1. The present apparatus and method provides approximation of FDR-LM1 (AFDR-LM1) by providing Gaussian approximation of noise.

The approximated FDR-LM1 (AFDR-LM1) is defined in Equation (8) below:

$$M_{\rho^I,P^I,N^I,q^I}^{AFDR-LM1} = \sum_{k=1}^{K} \left\{ -\frac{\|y_k - \sqrt{\rho^S} H_k^S P^S \hat{x}_k^S - \sqrt{\rho^I} H_k^I P^I \hat{x}_k^I\|^2}{\sigma_n^2} + \log\left(\sum_{i=1}^{N^I} \exp\{\Delta(q_i^I, \alpha_i)\} - (N^I - 1)\right) - \sum_{i=1}^{N^I} \log(|\chi_{q_i^I}|) \right\}. \quad (8)$$

According to an embodiment of the present disclosure, $\log(\sum_{i=1}^{N^I} \exp\{\Delta(q_i^I, \alpha_i)\} - (N^I - 1))$ may be realized. In one embodiment, a discount factor as $\delta \log(\sum_{i=1}^{N^I} \exp\{\Delta(q_i^I,$ $\alpha_i$}) may be applied, where $0<\delta<=1$. The present method may further determine $\alpha_i$ similarly as described for AFDR-LM2.

In the case of an SFBC serving cell, when the serving signal $x_k^S$ has dependency with respect to 'k', SFBC may be used for transmission of the serving signal. In the case when the serving signal uses SFBC, the received signal at two consecutive resource elements (REs) are correlated. Two consecutive REs together may be defined by Equation (9) below with SFBC interference and defined in Equation (10) below with non-SFBC interference.

With SFBC interference $$\begin{bmatrix} y_k \\ y_{k+1}^* \end{bmatrix} = \sqrt{\rho^S} \begin{bmatrix} H_k^S(:,1) & -H_k^S(:,2) \\ (H_{k+1}^S(:,2))^* & (H_{k+1}^S(:,1))^* \end{bmatrix} \begin{bmatrix} x_k^S(1) \\ (x_k^S(2))^* \end{bmatrix} + \quad (9)$$

$$\sqrt{\rho^I} \begin{bmatrix} H_k^I(:,1) & -H_k^I(:,2) \\ (H_{k+1}^I(:,2))^* & (H_{k+1}^I(:,1))^* \end{bmatrix} \begin{bmatrix} x_k^I(1) \\ (x_k^I(2))^* \end{bmatrix} + \begin{bmatrix} n_k \\ n_{k+1}^* \end{bmatrix} =$$

$$\sqrt{\rho^S} \begin{bmatrix} \tilde{H}_k^S \\ \tilde{H}_{k+1}^S \end{bmatrix} \tilde{x}_k^S + \sqrt{\rho^I} \begin{bmatrix} \tilde{H}_k^I \\ \tilde{H}_{k+1}^I \end{bmatrix} \tilde{x}_k^I + \begin{bmatrix} n_k \\ n_{k+1}^* \end{bmatrix} = \begin{bmatrix} \tilde{y}_k \\ \tilde{y}_{k+1} \end{bmatrix}.$$

With non-SFBC interference $$\begin{bmatrix} y_k \\ y_{k+1}^* \end{bmatrix} = \sqrt{\rho^S} \begin{bmatrix} H_k^S(:,1) & -H_k^S(:,2) \\ (H_{k+1}^S(:,2))^* & (H_{k+1}^S(:,1))^* \end{bmatrix} \begin{bmatrix} x_k^S(1) \\ (x_k^S(2))^* \end{bmatrix} + \quad (10)$$

$$\sqrt{\rho^I} \begin{bmatrix} H_k^I P^I & 0 \\ 0 & (H_{k+1}^I P^I)^* \end{bmatrix} \begin{bmatrix} x_k^I \\ (x_{k+1}^I)^* \end{bmatrix} + \begin{bmatrix} n_k \\ n_{k+1}^* \end{bmatrix} =$$

$$\sqrt{\rho^S} \begin{bmatrix} \tilde{H}_k^S \\ \tilde{H}_{k+1}^S \end{bmatrix} \tilde{x}_k^S + \sqrt{\rho^I} \begin{bmatrix} H_k^I P^I & 0 \\ 0 & (H_{k+1}^I P^I)^* \end{bmatrix} \begin{bmatrix} x_k^I \\ (x_{k+1}^I)^* \end{bmatrix} + \begin{bmatrix} n_k \\ n_{k+1}^* \end{bmatrix}.$$

Due to the correlation in the serving signal, 2 REs may be processed together to compute a decision metric. The AFDR-LM method may be defined by Equation (11) below with SFBC interference and defined in Equation (12) below with non-SFBC interference.

With SFBC interference $$M_{SFBC,\rho^I,q^I}^{AFDR-LM} = \sum_{k=1,odd}^{K} \left( -\frac{\sum_{i=k}^{k+1} \|\tilde{y}_i - \sqrt{\rho^S} \tilde{H}_i^S \hat{\tilde{x}}_k^S - \sqrt{\rho^I} \tilde{H}_i^I \hat{\tilde{x}}_k^I\|^2}{\sigma_n^2} + \quad (11)\right.$$

$$\left. \log\left(\sum_{i=1}^{2} \exp\{\Delta(q_i^I, \alpha_i)\}\right) - \sum_{i=1}^{2} \log(|\chi_{q_i^I}|) - \sum_{i=1}^{2} \log(|\chi_{q_i^S}|)\right).$$

With non-SFBC interference $$M_{non-SFBC,\rho^I,P^I,N^I,q^I}^{AFDR-LM} = \quad (12)$$

$$\sum_{k=1,odd}^{K} \left( -\frac{\|y_k - \sqrt{\rho^S} \tilde{H}_i^S \hat{\tilde{x}}_k^S - \sqrt{\rho^I} \tilde{H}_k^I P^I \hat{x}_k^I\|^2 +}{\sigma_n^2} + \right.$$

$$\frac{\|y_{k+1}^* - \sqrt{\rho^S} \tilde{H}_{k+1}^S \hat{\tilde{x}}_k^S - \sqrt{\rho^I} (H_{k+1}^I P^I \hat{x}_{k+1}^I)^*\|^2}{\sigma_n^2} +$$

$$\log\left(\sum_{j=0}^{1} \sum_{i=1}^{N^I} \exp\{\Delta(q_i^I, \alpha_{k+j,i})\}\right) -$$

$$\left. 2\sum_{i=1}^{N^I} \log(|\chi_{q_i^I}|) - \sum_{i=1}^{2} \log(|\chi_{q_i^S}|)\right).$$

When implementing the above expression in Equation (12), the MIMO detection complexity to find $\hat{\tilde{x}}_k^S$, $\hat{x}_k^I$, $\hat{x}_{k+1}^I$ considerably increases compared with Equation (7) due to joint processing of 2 REs. Equation (11) above does not suffer from such complexity increases since the interference signal $x_k^I$ also has correlation with respect to 'k' due to the SFBC assumption.

One alternative method to applying Equation (12) above may be directly applying Equation (7), i.e., ignoring the serving SFBC structure. Within the approach of directly applying Equation (7) it is not known whether interference uses SFBC or not. Such a determination is part of parameter estimation, and the decision may be made by choosing the one with a larger metric. If Equation (7) is directly used for non-SFBC interference hypothesis and Equation (11) is used for SFBC-hypothesis, then a processing mismatch may be created between the two hypotheses, which may result in performance degradation. To overcome the potential performance degradation issue, an embodiment of the present disclosure includes an approximation of Equation (12) by applying the bias term to Equation (7) as described in Equations (13) and (14) below.

AFDR-LM for SFBC serving cell:

$$M_{non-SFBC,\rho^I,P^I,N^I,q^I}^{AFDR-LM} = \quad (13)$$

$$\sum_{k=1}^{K} \left( -\frac{\|y_k - \sqrt{\rho^S} H_k^S P^S \hat{x}_k^S - \sqrt{\rho^I} H_k^I P^I \hat{x}_k^I\|^2}{\sigma_n^2} + \right.$$

$$\log\left(\sum_{i=1}^{N^I} \exp\{\Delta(q_i^I, \alpha_i)\}\right) + \Delta'(q^S, \beta) -$$

$$\left. \sum_{i=1}^{N^I} \log(|\chi_{q_i^I}|) - \sum_{i=1}^{2} \log(|\chi_{q_i^S}|)\right),$$

$$M_{SFBC,\rho^I,q^I}^{AFDR-LM} = \sum_{k=1,odd}^{K} \left( -\frac{\sum_{i=k}^{k+1} \|\tilde{y}_i - \sqrt{\rho^S} \tilde{H}_k^S P^S \hat{\tilde{x}}_k^S - \sqrt{\rho^I} \tilde{H}_k^I \hat{\tilde{x}}_k^I\|^2}{\sigma_n^2} + \quad (14)\right.$$

$$\left. \log\left(\sum_{i=1}^{2} \exp\{\Delta(q_i^I, \alpha_i)\}\right) - \sum_{i=1}^{2} \log(|\chi_{q_i^I}|) - \sum_{i=1}^{2} \log(|\chi_{q_i^S}|)\right).$$

An exemplary characterization of $\beta$ is given below which corresponds to the serving+interference to noise ratio (SPINR) and is described in Equation (15) below $$\beta = \sum_{i=1}^{N_{rx}} \frac{1}{\sigma_n^2 N_{rx}} \left\{ \sum_{j=1}^{N_{tx,S}} \frac{|H_k^S(i,j)|^2}{N_{tx,S}} + \sum_{j=1}^{N_{tx,I}} \frac{|H_k^I(i,j)|^2}{N_{tx,I}} \right\}. \quad (15)$$

Figure 2:
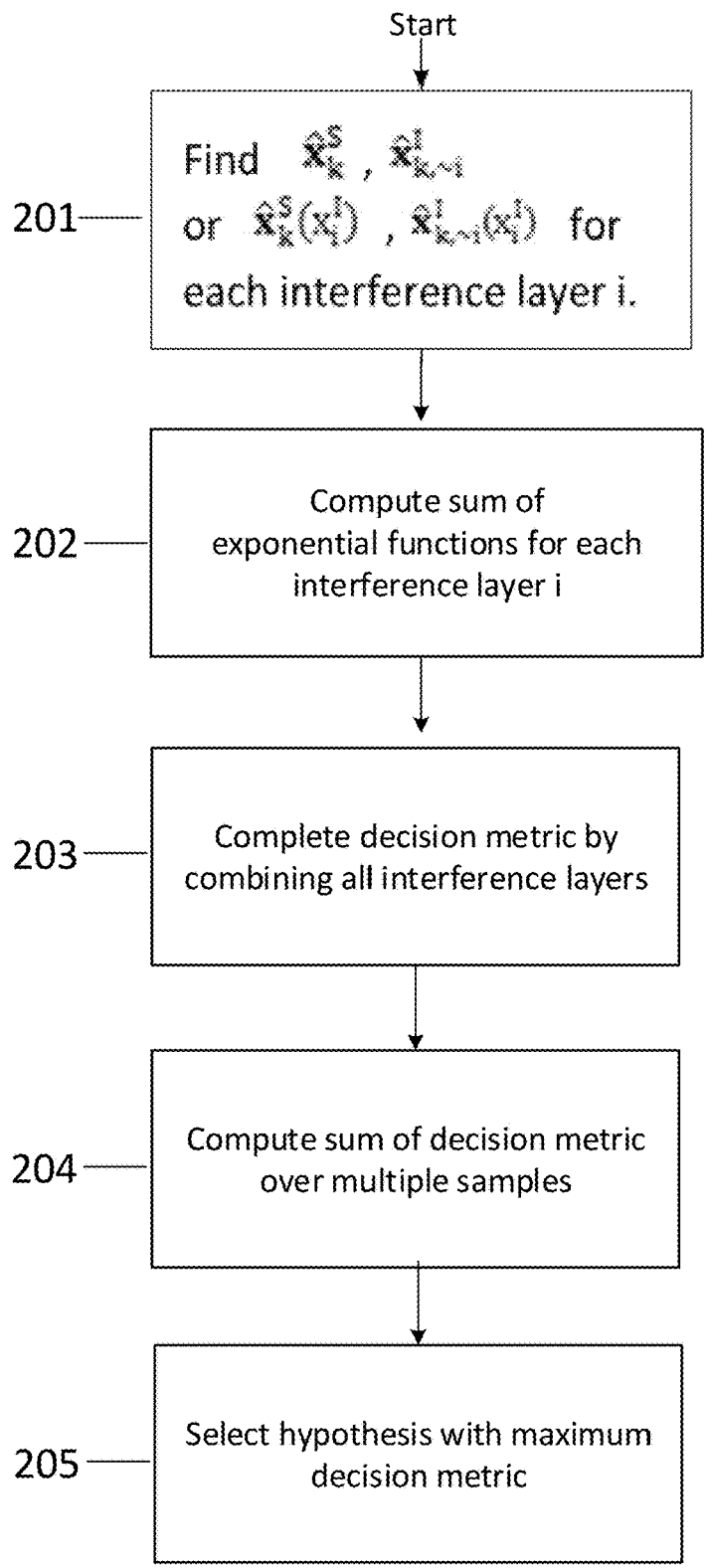
FIG. 2 is a flowchart of a method of estimating interference parameters in a communication network with multiple interfering layers, according to an embodiment of the present disclosure.

FIG. 2 is a flowchart of a method of estimating interference parameters in a communication network with multiple interfering layers, according to an embodiment of the present disclosure.

Referring to FIG. 2, at 201, for each interference layer, i, the parameters, $\hat{x}_k^S \hat{x}_{k,-i}^I$ or the parameters $\hat{x}_k^S(x_i^I) \hat{x}_{k,-i}^I(x_i^I)$ are computed. At 202, a sum of exponential functions is computed for each interference layer i. At 203, a decision metric is determined by combining all interference layers. At 204, a summation is computed of the decision metric determined at 203 over multiple samples. At 205, the hypothetical interferer is determined using a maximum likelihood decision metric.

Figure 3:
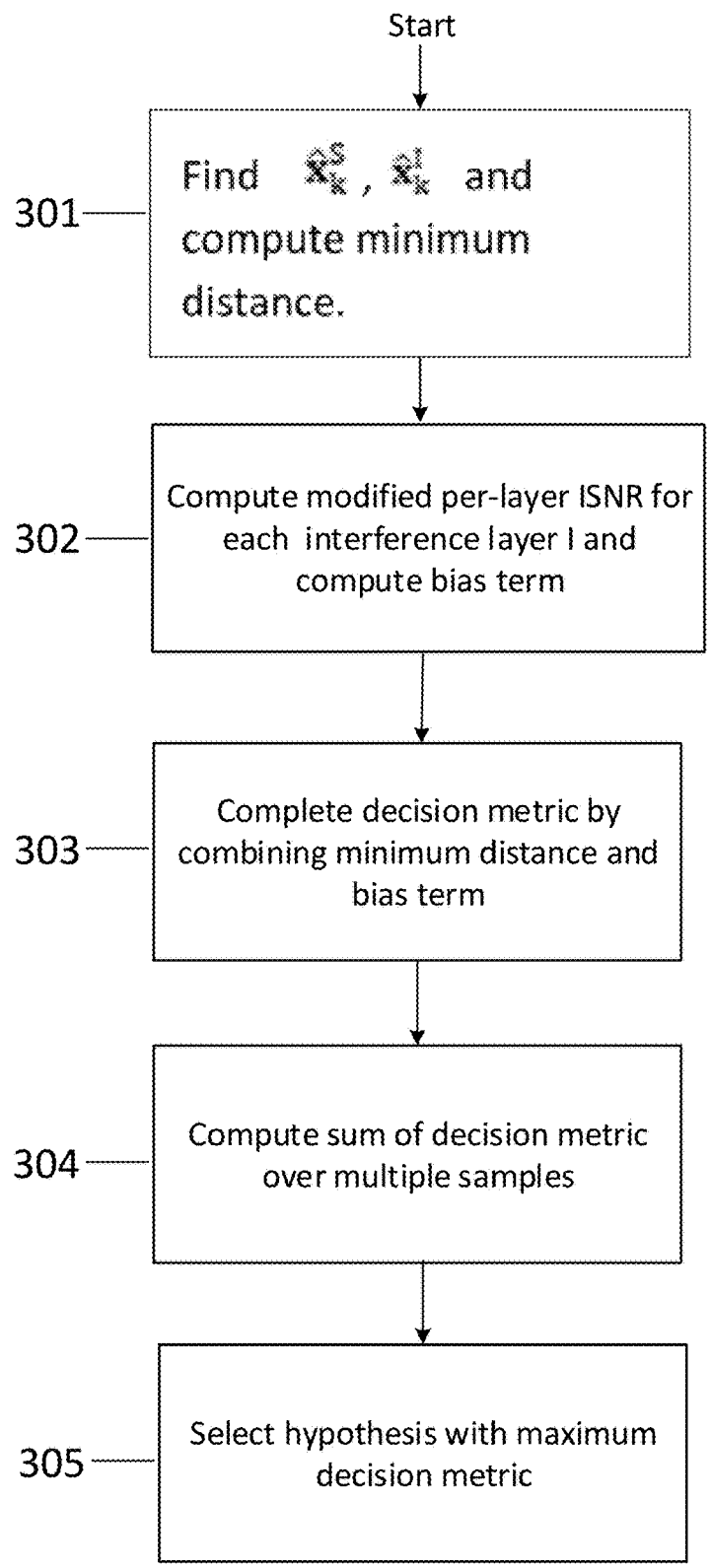
FIG. 3 is a flowchart of another method of estimating interference parameters in a communication network with multiple interfering layers, according to an embodiment of the present disclosure.

FIG. 3 is a flowchart of another method of estimating interference parameters in a communication network with multiple interfering layers, according to an embodiment of the present disclosure.

Referring to FIG. 3, at 301, the parameters, $\hat{x}_k^S$, $\hat{x}_k^I$ are computed to determine a minimum distance between a serving signal and a hypothetical interfering signal. At 302, a modified ISNR is computed for each interference layer, i, and a bias term is computed. The bias term compensates for a difference between the FDR-LM metric and the minimum distance term for each candidate group of interference parameters. The value to be applied to the bias term may be stored in a look up table (LUT) in memory 130 for retrieval by the processor 120. The LUT may record a bias value due to a difference between the FDR-LM metric and the minimum distance term for each candidate group of interference parameters with respect to a given INR. At 303, a decision metric is determined by combining the minimum Euclidian distance between a serving signal and a hypothetical interfering signal determined at 301 with the bias term computed at 302. At 304, a summation is computed of the decision metrics determined at 303 over multiple samples. At 305, the hypothetical interferer is determined using a maximum likelihood decision metric.

Figure 4:
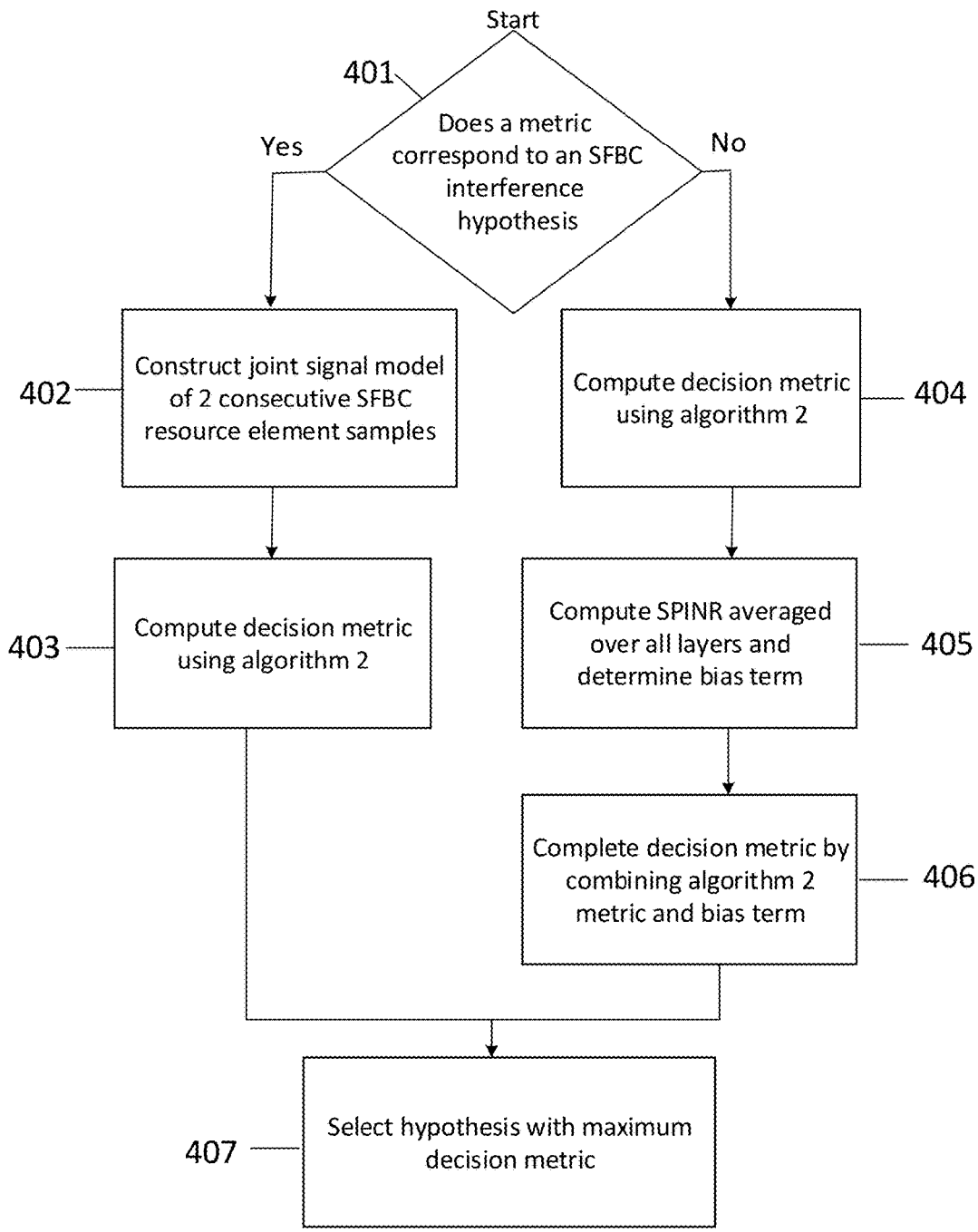
FIG. 4 is a flowchart of another method of estimating interference parameters in a communication network with multiple interfering layers, according to an embodiment of the present disclosure.

FIG. 4 is a flowchart of another method of estimating interference parameters in a communication network with multiple interfering layers, according to an embodiment of the present disclosure.

Referring to FIG. 4, at 401, a determination is made whether a metric corresponds to an SFBC interference hypothesis. If yes, then at 402, a joint signal model is constructed using 2 consecutive SFBC resource element samples. At 403, a decision metric is computed using the method illustrated in the flowchart of FIG. 3. At 407, the hypothetical interferer is determined using a maximum likelihood metric.

If the decision at 401 is no, then at 404 a decision metric is computed using the method illustrated in the flowchart of FIG. 3. At 405 a signal plus interference noise ratio (SPINR) is computed using an average over all layers and a bias term is determined. At 406, a decision metric is completed by combining the decision metric determined at 404 with the bias term determined at 405. At 407, the hypothetical interferer is determined using a maximum likelihood metric.

Figure 5:
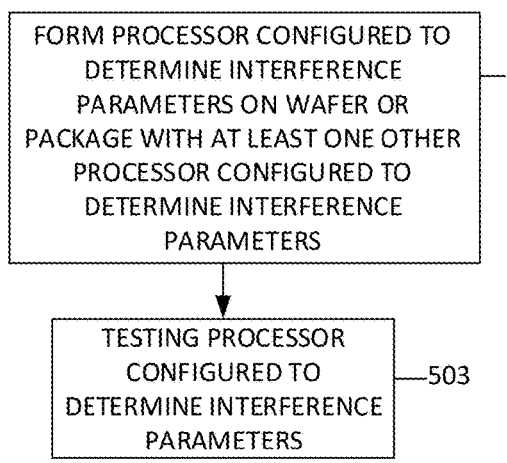
FIG. 5 is a flowchart of a method of testing a processor configured to estimate interference parameters, according to an embodiment of the present disclosure.

FIG. 5 is a flowchart of a method of testing a processor configured to determine interference parameters according to an embodiment of the present disclosure, where the processor is either implemented in hardware or implemented in hardware that is programmed with software.

Referring to FIG. 5, the method, at 501, forms the processor as part of a wafer or package that includes at least one other processor. The processor is configured to receive a desired signal from a serving base station, receive a plurality of interfering signals from one or more base stations, determine a maximum likelihood (ML) decision metric to determine a value of a transmit power, a value of a rank, a value of a precoding matrix, a value of a modulation and a value of a transmission scheme of the plurality of interfering signals, apply a logarithm function to the ML decision metric, and apply a maximum-log approximation function to a serving data vector and an interference data vector, which are included in the ML decision metric, determine the values of transmit power, rank, precoding matrix, modulation order and transmission scheme using the applied ML decision metric, and cancel the interfering signals from the received signals using the determined values of transmit power, rank, precoding matrix, modulation order and transmission scheme.

At 503, the method tests the processor. Testing the processor includes testing the processor and the at least one other processor using one or more electrical to optical converters, one or more optical splitters that split an optical signal into two or more optical signals, and one or more optical to electrical converters.

Figure 6:
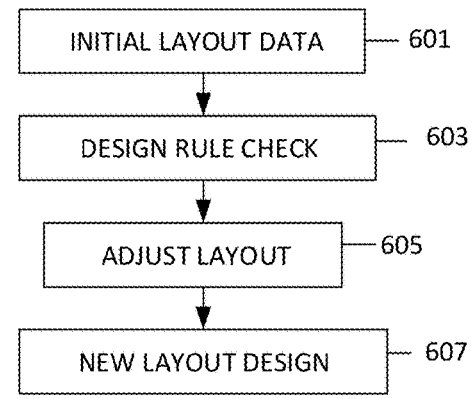
FIG. 6 is a flowchart of a method of manufacturing a processor configured to estimate interference parameters, according to an embodiment of the present disclosure.

FIG. 6 is a flowchart of constructing an integrated circuit, according to an embodiment of the present disclosure.

Referring to FIG. 6, the method, at 601, comprises the initial layout of data in which the method generates a mask layout for a set of features for a layer of the integrated circuit. The mask layout includes standard cell library macros for one or more circuit features that include a processor. The processor is configured to receive a desired signal from a serving base station, receive a plurality of interfering signals from one or more base stations, determine a maximum likelihood (ML) decision metric to determine a value of a transmit power, a value of a rank, a value of a precoding matrix, a value of a modulation and a value of a transmission scheme of the plurality of interfering signals, apply a logarithm function to the ML decision metric, and apply a maximum-log approximation function to a serving data vector and an interference data vector, which are included in the ML decision metric, determine the values of transmit power, rank, precoding matrix, modulation order and transmission scheme using the applied ML decision metric, and cancel the interfering signals from the received signals using the determined values of transmit power, rank, precoding matrix, modulation order and transmission scheme.

At 603, there is a design rule check in which the method disregards relative positions of the macros for compliance to layout design rules during the generation of the mask layout.

At 605, there is an adjustment of the layout in which the method checks the relative positions of the macros for compliance to layout design rules after generating the mask layout.

At 607, a new layout design is made, in which the method, upon detection of noncompliance with the layout design rules by any of the macros, modifies the mask layout by modifying each of the noncompliant macros to comply with the layout design rules, generates a mask according to the modified mask layout with the set of features for the layer of the integrated circuit and manufactures the integrated circuit layer according to the mask.

While the present disclosure has been particularly shown and described with reference to certain embodiments thereof, it will be understood by those of ordinary skill in the art that various changes in form and details may be made therein without departing from the spirit and scope of the present disclosure as defined by the appended claims and their equivalents.

What is claimed is:

1. A method, comprising:
receiving a desired signal from a serving base station;
receiving a plurality of interfering signals from one or more base stations;
estimating a maximum likelihood (ML) decision metric of the plurality of interfering signals;
applying a logarithm function to the ML decision metric, and applying a maximum-log approximation function to a serving data vector and an interference data vector, which are included in the ML decision metric;
determining the values of a transmit power, a rank, a precoding matrix, a modulation order, and a transmission scheme using the applied ML decision metric; and
cancelling the interfering signals from the received signal using the determined values of the transmit power, the rank, the precoding matrix, the modulation order, and the transmission scheme.

2. The method of claim 1, wherein at least one of the desired signal and the interfering signal are transmitted from at least one base station with multiple input multiple output (MIMO) antennas.

3. The method of claim 1, wherein the modulation order includes at least one of 4 quadrature amplitude modulation (QAM), 16 QAM, 64 QAM, 256 QAM, 512 QAM, 1024 QAM, 2048 QAM and 4096 QAM.

4. The method of claim 1, wherein the rank value includes a value belonging to a finite set.

5. The method of claim 1, wherein the precoding matrix value includes a value belonging to a finite set.

6. The method of claim 1, wherein the transmission scheme value includes a value belonging to a finite set.

7. The method of claim 1, wherein the applied ML decision metric includes a bias term which reduces performance degradation in a cellular communication system due to the approximation of the maximum log function.

8. The method of claim 7, wherein the bias term compensates for a difference between a further dimension reduced log-map (FDR-LM) metric and a minimum Euclidean distance value for each candidate group of values of transmit power, rank, precoding matrix, modulation order and transmission scheme.

9. The method of claim 8, wherein the bias term is computed using a per-layer bias wherein the per-layer bias is computed using a per-layer modified interference to signal plus noise ratio (ISNR) approximation of other layer signals.

10. The method of claim 1, wherein estimating the ML decision metric comprises multiple single-dimensional summations of the interfering signals.

11. An apparatus, comprising:
a processor configured to:
receive a desired signal from a serving base station;
receive a plurality of interfering signals from one or more base stations;
estimate a maximum likelihood (ML) decision metric of the plurality of interfering signals;
apply a logarithm function to the ML decision metric, and apply a maximum-log approximation function to a serving data vector and an interference data vector, which are included in the ML decision metric;
determine the values of a transmit power, a rank, a precoding matrix, a modulation order and a transmission scheme using the applied ML decision metric; and
cancel the interfering signals from the received signal using the determined values of the transmit power, the rank, the precoding matrix, the modulation order, and the transmission scheme.

12. The apparatus of claim 11, further comprising multiple input multiple output (MIMO) antennas, wherein at least one of the desired signal and the interfering signal are transmitted from a base station to the MIMO antennas.

13. The apparatus of claim 11, wherein the modulation order includes at least one of 4 quadrature amplitude modulation (QAM), 16 QAM, 64 QAM, 256 QAM, 512 QAM and 1024 QAM.

14. The apparatus of claim 11, wherein the rank value includes a value belonging to a finite set.

15. The apparatus of claim 11, wherein the precoding matrix value includes a value belonging to a finite set.

16. The apparatus of claim 11, wherein the transmission scheme value includes a value belonging to a finite set.

17. The apparatus of claim 11, wherein the applied ML decision metric includes a bias term which reduces performance degradation in the cellular communication system due to the approximation of the maximum log function.

18. The apparatus of claim 17, wherein the bias term compensates for a difference between a further dimension reduced log-map (FDR-LM) metric and a minimum Euclidean distance value for each candidate group of values of transmit power, rank, precoding matrix, modulation order and transmission scheme.

19. The apparatus of claim 18, wherein the processor is further configured to compute the bias term using a per-layer bias wherein the per-layer bias is computed using a per-layer modified interference to signal plus noise ratio (ISNR) approximation of other layer signals.

20. The apparatus of claim 11, wherein the processor is further configured to estimate the ML decision metric using multiple single-dimensional summations of the interfering signals.

* * * * *